United States Patent [19]
Buchanan et al.

[11] Patent Number: 5,492,684
[45] Date of Patent: Feb. 20, 1996

[54] GRADED-BED SYSTEM FOR IMPROVED SEPARATIONS

[75] Inventors: J. Scott Buchanan, Mercerville; Khushrav E. Nariman, Lawrenceville, both of N.J.

[73] Assignee: Mobil Oil Corporation, Fairfax, Va.

[21] Appl. No.: 335,027

[22] Filed: Nov. 7, 1994

Related U.S. Application Data

[63] Continuation-in-part of Ser. No. 86,255, Jul. 6, 1993, abandoned.

[51] Int. Cl.$^6$ ........................................ B01D 53/50
[52] U.S. Cl. ........................ 423/244.01; 423/244.02; 423/244.06
[58] Field of Search .................... 423/210, 239.1, 423/239.2, 244.01, 244.02, 244.06; 422/177, 181

[56] References Cited

U.S. PATENT DOCUMENTS

| | | | |
|---|---|---|---|
| 4,790,982 | 12/1988 | Yoo et al. | 423/239 |
| 4,997,544 | 3/1991 | Chou et al. | 208/59 |
| 5,209,773 | 5/1993 | Audhe et al. | 75/388 |
| 5,229,091 | 7/1993 | Buchanan et al. | 423/244.01 |
| 5,292,492 | 3/1994 | Buchanan et al. | 423/222 |
| 5,294,409 | 3/1994 | Cohen et al. | 422/169 |

FOREIGN PATENT DOCUMENTS 1504586 3/1975 United Kingdom .

Primary Examiner—Gary P. Straub
Assistant Examiner—Timothy C. Vanoy
Attorney, Agent, or Firm—A. J. McKillop; D. P. Santini; G. L. Harris

[57] ABSTRACT

A method and system useful for the removal of contaminants such as sulfur oxides from waste gas streams using a graded-bed system is disclosed. The graded-bed system uses beds with solid sorbents of two or more particle sizes in separate sections of the bed. In one embodiment, the solid sorbents are arranged so that the larger sorbent particles are disposed in the entrance region of the graded-bed system. In operation, a waste gas stream is passed over and through the solid sorbents so that contaminants, such as sulfur oxides and/or nitrogen oxides are adsorbed. The sorbent bed is then contacted with a reducing gas to desorb the sulfur oxides.

21 Claims, 2 Drawing Sheets

GRADED-BED SYSTEM FOR IMPROVED SEPARATIONS

CROSS-REFERENCE TO RELATED APPLICATIONS

This is a Continuation-in-Part (CIP) of U.S. application Ser. No. 08/086,255, filed Jul. 6, 1993, now abandoned.

FIELD OF THE INVENTION

The present invention is directed to a method for enhancing reactions which are intra-particle mass transfer limited. Specifically, the present invention is directed to the use in a fixed-bed, gas-solid reaction system of two or more beds of solid catalysts which each have a different average particle size, thus providing enhanced reaction performance at a constant pressure drop or lower pressure drop at constant reaction performance.

BACKGROUND OF THE INVENTION

Petroleum refinery streams are typically desulfurized by the Claus process. In the Claus process, elemental sulfur is produced by reacting $H_2S$ and $SO_2$ in the presence of a catalyst. The Claus system uses a combustion chamber which, at 950°–1,350° C., converts 50 to 70% of sulfur contained in the feed gas into elemental sulfur. Sulfur is condensed by cooling the reaction gas to a temperature below the dew point of sulfur, after which the remaining gas is heated and further reacted over a catalyst. Normally, the gas passes through at least two such Claus catalyst stages.

The different stages of the process may be represented by the following equations:

$$H_2S + 3/2\ O_2 \rightarrow SO_2 + H_2O \quad \text{(I)}$$

$$2\ H_2S + SO_2 \rightarrow 3\ S_n + 2\ H_2O \quad \text{(II)}$$

The overall reaction is:

$$3\ H_2S + O_2 \rightarrow 3\ S_n + H_2O \quad \text{(III)}$$

Below 500° C, the symbol n has a value of approximately 8.

The final Claus exhaust gas still contains small amounts of $H_2S$, $SO_2$, $CS_2$, carbon oxysulfide, CO, and elemental sulfur in the form of a vapor or mist. The exhaust gas can be subjected to post-combustion to convert substantially all sulfur species to sulfur oxides, for example, $SO_2$ and $SO_3$, which are then emitted into the atmosphere.

Sulfur emitted as sulfur oxides ("$SO_x$") into the atmosphere with the exhaust gas may amount to 2–6% of the sulfur contained in the feed gas in the form of $H_2S$. In view of air pollution and the loss of sulfur involved, further purification is imperative.

Claus aftertreatments have been developed. These are carried out after the last Claus stage or after the post-combustion. These aftertreatments include, for example, dry and liquid phase processes for catalytic conversion of $H_2S$ and $SO_2$ to elemental sulfur, catalytic hydrogenation and hydrolysis of sulfur compounds into $H_2S$ for further processing, and oxidation of all sulfur compounds into $SO_x$ for further processing by adsorption in dry processes or absorption in wet processes.

The dry processes typically involve a gas-solid reaction. Gas-solid reactions such as these are often limited by the intra-particle mass transfer rate. This requires the use of small particles in order to achieve a sufficient degree of reaction within a reasonable reactor length. Increasing the reactor length provides the required degree of conversion, but results in a proportionately higher pressure drop, and is often undesirable due to other process restrictions. In the case of waste-gas clean up processes like those mentioned above, the available pressure drop is frequently small, and the costs involved in the addition of an extra blower in the system to provide a large pressure head for the packed bed system may be significant.

In view of the foregoing, improving gas-solid reaction system methods and apparatus is desirable. In particular, it would be beneficial to provide a mechanism for achieving high conversion efficiencies while maintaining a relatively low pressure drop through the packed bed in a dry process. This can be achieved by providing an improved conversion potential catalyst bed design that maintains a relatively low pressure drop.

It is, therefore, an object of the present invention to provide an improved method and apparatus for gas-solid reactions to remove contaminants such as sulfur oxides and/or nitrogen oxides from waste gas streams.

It is a further object of the present invention to remove the above-described contaminants without incurring an unacceptable pressure loss in the system.

SUMMARY OF THE INVENTION

This invention is useful in, at least partially, overcoming intra-particle mass transfer limitations in adsorption of sulfur oxides and thus allowing increased utilization of solid sulfur oxide adsorbents. In accordance with the present invention, there is provided an improved gas-solid reaction system which is useful in the processing of a waste gas such as Claus plant tail-gas, heater and boiler flue gases and combustion off-gases and removing contaminants from the gas stream, for example, adsorption of sulfur oxides and/or nitrogen oxides.

The gas-solid reaction system of the present invention may be arranged as a container having an entrance region and an exit region. The gas-solid reaction system contains at least two solid adsorbents, each being, in general, a material that has the ability to catalyze a reaction with the waste gas contaminants or to adsorb the waste gas contaminants. The second solid adsorbent should have a particle size smaller than that of the first. The first solid adsorbent is preferably disposed inside the container in the area of the entrance region. The second solid adsorbent is disposed inside the container on the exit region side of the first solid adsorbent. Thus, waste gas containing contaminants like sulfur oxides and nitrogen oxides can be passed through both beds of the gas-solid reaction system for removal of these contaminants.

As a result of the present invention, the removal of contaminants from waste gases using a gas-solid reaction system is significantly improved. This invention uses a graded-bed which provides improved performance in contaminant removal from waste gas (equivalent to that of a longer bed) for the same pressure drop. This invention improves the overall performance of a packed-bed system, providing increased capacity at the same flow rate and pressure-drop and maintaining the same bed size. Hence, for effectively the same amount of sorbent and the same process conditions, a multi-stage packed bed system offers the advantage of enhanced performance as compared to that for a packed bed system containing sorbent of a single particle size. This benefit is most pronounced in processes for waste-gas cleanup using reactive gas-solid separations, where very low outlet concentrations are desirable. Of special note here is the applicability of this invention to sulfur removal processes where sulfur oxide removal efficiencies of greater than 99.9% are desirable and $SO_x$ concentrations at the reactor outlet need to be reduced to below 20 ppm, e.g., below about 10 ppm, e.g., below about 5 ppm, while at the same time, the available pressure drop is limited to less than about 5 psi, e.g., 2 to 5 psi, due to process limitations, especially where the inlet sulfur oxide concentration is less than about 2%, e.g., less than about 1%, or where the adsorbent is loaded to a level of sulfur oxides adsorbed of greater than or equal to about 35%, e.g., about 39%.

An embodiment of the method of this invention is a process for adsorption of sulfur oxides from a waste gas which is substantially free of entrained particulate matter, said process comprising the steps of (a) contacting a waste gas which is substantially free of entrained particulate matter, which waste gas contains sulfur oxides with a solid adsorbent under conditions effective to promote capture of sulfur oxides from the waste gas onto the solid adsorbent to thereby produce a treated waste gas and a solid adsorbent having sulfur compounds thereon, the solid adsorbent having particle sizes ranging from larger particles to smaller particles, the waste gas contacting the larger particles before contacting the smaller particles; (b) directing the treated waste gas from the solid adsorbent; (c) terminating contact between the waste gas and the solid adsorbent after the solid adsorbents have become substantially loaded with sulfur oxides as evidenced by breakthrough of increased amounts of sulfur oxides into the treated waste gas; (d) regenerating the solid adsorbent by contacting it with a reducing gas, under conditions effective to desorb at least a portion of the sulfur compounds thereon, thereby producing an offgas stream and a desulfated solid adsorbent; (e) directing the offgas stream from the solid adsorbent to a downstream sulfur recovery process; and (f) returning the desulfated solid adsorbent into contact with the waste gas. The adsorbent may also have at least two different average particle sizes, one larger than the other. In this variation, the waste gas contacts the larger adsorbent particles first.

Another embodiment of the process of the instant invention is a process for adsorption of sulfur oxides from a substantially particulate-free waste gas in a reaction system suitable for intra-particle mass transfer limited gas-solid reactions, said process comprising: (a) providing a reaction vessel comprising a container having an entrance region and an exit region, a first solid adsorbent disposed in a first bed inside said container in the area of said entrance, a second solid adsorbent having a particle size smaller than that of said first solid adsorbent, said second solid adsorbent disposed in a second bed inside said container; (b) passing a substantially particulate-free waste gas stream comprising sulfur oxides into said reaction vessel through said entrance region; (c) successively contacting said waste gas stream with said first and second solid adsorbents at a pressure and temperature sufficient to promote adsorption of sulfur oxides onto said solid adsorbents and to thereby produce a treated waste gas; (d) passing said treated waste gas stream from said reaction vessel through said exit region; (e) ceasing adsorption of sulfur oxides on said first and second solid adsorbents after said solid adsorbents have become substantially loaded with sulfur oxides as evidenced by breakthrough of increased amounts of sulfur oxides into the treated waste gas stream; (f) regenerating the first and second solid adsorbents by contacting them with a reducing gas, at a pressure and temperature whereby said sulfur oxides are desorbed from said solid adsorbents into an offgas stream; and (g) passing said offgas stream from said reaction vessel through said exit region into a downstream sulfur recovery process.

As mentioned above, the process of the instant invention is particularly useful for treating substantially particulate-free gases. Gases which contain entrained solid or liquid particulates or may be passed through a filter, cyclone, or guard bed to thus produce a substantially particulate-free gas prior to being directed over the catalyst or adsorbent of this invention. By substantially particulate-free gas is meant a gas, which, under normal operation according to the method of this invention, will not plug the adsorbent of this invention with particulates, e.g., that will not cause an unacceptable high pressure drop across the adsorbent, e.g., will not cause a pressure drop increase sufficient to require the adsorbent to be taken out of service and skimmed, screened, or replaced to remove the particulates prior to the time required to replace the adsorbent due to reduced adsorption capacity, e.g., about 4 months of operation.

As used herein, the reference to reactions which are intra-particle mass transfer limited is intended to include those reactions in which the rate of mass transfer from the bulk reactant mixture to the surface of the adsorbent particle is faster than the rate of mass transfer from the surface to the interior of the adsorbent particle, e.g., those reactions in which conversion may be increased through the use of adsorbents having smaller particle sizes. The adsorption of sulfur oxides from a waste gas is one particular example of this type of reaction.

DETAILED DESCRIPTION OF THE INVENTION

Figure 1:
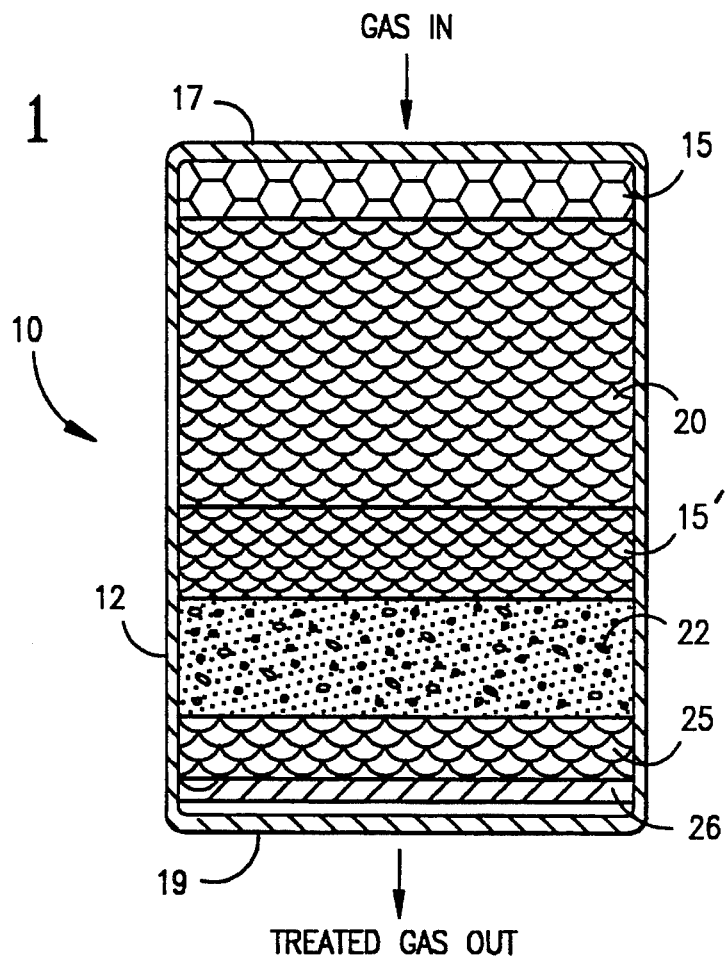
FIG. 1 is a schematic side view of a gas-solid reaction vessel prepared in accordance with the present invention.

The gas-solid reaction system of the present invention is typically arranged as a container having an entrance region and an exit region. The entrance region is adapted to receive an oncoming waste gas stream for treatment to remove components of the gas such as sulfur oxides and nitrogen oxides and the exit region directs the treated waste gas stream to further gas processing apparatus. The reaction system of the present invention contains at least two solid adsorbents which may also contain one or more metal or metal oxides, or in general, materials that have the ability to catalytically remove or to adsorb the contaminants from the waste gas stream. The adsorbents typically are of at least two particle sizes and preferably are arranged so that the first solid adsorbent is disposed inside the container in the area of the entrance region of the container. The second solid adsorbent has a particle size which is smaller than that of the first solid adsorbent and is located adjacent to and on the side closest to the exit region of the first solid adsorbent. Additional solid adsorbents may also be included in the reaction system. Each additional solid adsorbent would have a particle size smaller than the particle sizes of the adsorbents already in the reaction system and would be located in the reaction system away from the entrance region in order of decreasing particle size following the first and second solid adsorbents mentioned above.

Some solid adsorbents will have a range or distribution of particle sizes, in this case, the entrance or leading portion of the bed would be packed with particles above a certain size and the trailing portion of the bed would consist of particles smaller than the minimum size in the first section. In addition, the bed could have more than two such sections with particle sizes decreasing in several stages from the inlet to the outlet of the packed bed. providing a changing activity or capacity for different components present in the gas stream.

In a reaction system of the present invention with two solid adsorbent beds, the first solid adsorbent bed may span about 10% to about 95% of the length of two solid adsorbent beds, typically about 70 to 80%. The lengths selected for the first solid adsorbent bed and the second solid adsorbent bed may be any combination of lengths that are effective to achieve the desired adsorption capacity. Through use of the Ergun equation, hereinafter described, dependent upon the waste gas composition and flow rate, the particle sizes of the solid adsorbents, the dimensions of the reaction system, and the operating conditions of the reaction system, estimates for bed pressure drops may be related to bed lengths, if desired.

The process of the instant invention may be used in the processes described in U.S. Pat. Nos. 5,229,091 and 5,292,492, incorporated by reference herein.

The catalytic functioning of dry solid oxides, e.g. adsorbents, for applications involving the adsorption of sulfur oxides from a gas stream, or the concentration of sulfur oxides for subsequent reaction in a downstream processing unit may be broadly typified by the reaction scheme illustrated below.

Solid Oxide+$SO_2$+½ $O_2$→Solid Oxide•$SO_3$ (I)

Solid Oxide•$SO_3$+Reducing Gas→Removed Sulfur (II)

Species+"Reduced Solid Oxide" "Reduced Solid Oxide"⇌+$O_2$→Solid Oxide (III)

Reaction I indicates the oxidative reaction of $SO_2$, which is thought to occur via the oxidation of sulfur oxide mixtures (i.e., $SO_2$ and $SO_3$) and the combination of the $SO_3$ with the solid oxide on the catalyst. In the open literature, this has been called "Catalyst Sulfation," and after the combination with the solid oxide, the sulfur oxide-containing material is commonly called a "Sulfated Catalyst." As used herein "sulfation" is intended to refer to the reaction, chemisorption, such as would include sorption of $SO_3$, and physisorption, such as might be depicted M•$SO_3$, where M is the sorbent.

Reaction II involves the reduction or regeneration of the so-called sulfated catalyst. The sulfur oxides are released primarily as a mixture of $SO_2$, elemental sulfur, $H_2S$, and other sulfur containing compounds. The reaction also leads to a solid oxide which reacts with oxygen and thus is and other sulfur containing compounds. The reaction also leads to a solid oxide which reacts with oxygen and thus is termed a "Reduced Solid Oxide." A partial list of gases generally considered as reductants suitable to induce the release of the sulfur compounds are hydrogen containing streams (e.g., steam reformer or naphtha reformer hydrogen, catalytic hydrogenation unit purge streams, etc.), and hydrocarbons such as propane.

Reaction III represents the oxidative calcination of the "Reduced Solid Oxide." It may be the reaction of air or other suitable oxidizing media with the reduced solid oxide, and yields a calcined solid oxide which may undergo more cycles of reactions I through II above. If desired, reaction III may be combined with reaction I to eliminate one processing step.

Non-limiting examples of suitable solid adsorbents for use in the present invention include the porous solids, alumina, silica, silica-alumina, natural and synthetic zeolites, activated carbon, spinels, clays and combinations thereof. Gamma (γ) alumina, chi-eta-rho (x,η,ρ) alumina, delta (δ) alumina, and theta (θ) alumina are particularly useful as adsorbents and supports because of their high surface areas. The term "adsorbent" is used interchangeably herein with the term "absorbent." While alpha (α) alumina and beta (β) alumina can be used as adsorbents, they are not as effective as gamma, chi-eta-rho, delta and theta alumina. One or more oxides of other metals can also be used as adsorbents, either alone or in combination with alumina or as spinels, such as, for example, bismuth, manganese, yttrium, antimony, tin, copper, Group 1a metals, Group 2a metals, rare earth metals, and combinations thereof. Magnesium aluminate spinels are particularly useful as adsorbents. Lanthanum and cerium are preferred rare earth metals. Naturally occurring rare earths, such as in the form of baestenite, are also useful adsorbents. Elemental copper or copper compound adsorbents, such as copper oxide adsorbents, can also be used. The copper oxide can be cuprous oxide ($Cu_2O$) and/or cupric oxide (CuO). Other copper compounds can be used, such as copper (II) sulfate, copper (II) acetate, copper (II) formate, copper (II) nitrate and/or copper (II) chloride. The adsorbents can also be a blend/mixture of high density and low density materials, such as of the above-identified metal oxides.

Also, a metal or metal oxide may be deposited on the solid adsorbent or may be used alone. The metal or metal oxide part of the adsorbents can be supported, carried and held on a refractory support or carrier material which also provides part of the adsorbent. The support controls the attrition and surface area characteristics of the adsorbent. The support preferably has a surface area greater than about 10 $m^2/g$ and most preferably from about 50 $m^2/g$ to about 500 $m^2/g$ for best results. Suitable supports include, but are not limited to, silica, alumina, kaolin or other clays, diatomaceous earth, boria, and/or mullite. The support can comprise the same material as the metal or metal oxide part of the adsorbent.

Non-limiting examples of the shapes for the adsorbent for use in the present invention include the adsorbent can be in the form of balls, pebbles, spheres, extrudates, channeled monoliths, microspheres, pellets or structural shapes, such as lobes.

As mentioned above, the preferred solid adsorbents are magnesium aluminate spinels that are magnesia rich and also have cerium and vanadium deposited on the adsorbents. These adsorbents are substantially described in U.S. Pat. Nos. 4,790,982 to Yoo et al., 4,472,267 to Yoo et al., and 4,469,589 to Yoo et al. The disclosures of U.S. Pat. Nos. 4,790,982; 4,472,267; and 4,469,589 are herein incorporated by reference. In general, the magnesium aluminate spinels useful in the present invention may be prepared by methods which are conventional and well known in the art.

Non-limiting examples of the solid adsorbent particle sizes in the present invention include a first solid adsorbent with have a particle size of about ⅛ inch to about ¾ inch, preferably about ¼ inch to about ½ inch, and most preferably about ⅜ inch to about ½ inch, and a second solid adsorbent with a particle size smaller than that of the first solid adsorbent, preferably about 25 to about 90% smaller. For example, the second solid adsorbent may have a particle size of about 1/32 inch to about ⅜ inch and preferably about 1/16 inch to about ⅛ inch.

The adsorbents can be impregnated or otherwise coated with an oxidizing catalyst or promoter that promotes the removal of nitrogen oxides and the oxidation of $SO_2$ to $SO_3$ in the presence of oxygen. It is believed that $SO_3$ is more readily adsorbed than $SO_2$. One useful catalyst is ceria (cerium oxide). Another useful catalyst is platinum. Other catalytic metals, both free and in a combined form, preferably as an oxide form, can be used, either alone or in combination with each other or in combination with ceria and/or alumina, such as rare earth metals, metals from Group 8 of the Periodic Table, chromium, vanadium, rhenium, tungsten, silver, and combinations thereof. The promoter can comprise the same material as the adsorbent. An even distribution of the promoter is preferred for best results and to minimize adsorbent erosion.

The Group 1a metals, Group 2a metals, and Group 8 metals referred to are those listed in the Periodic Table of the Elements in the Handbook of Chemistry and Physics (54th Edition). Materials useful as adsorbents, catalysts, or promoters in the process of this invention include the Group 1a metals including lithium, sodium, potassium, rubidium, and cesium; the Group 2a metals including magnesium, calcium, strontium, and barium; the Group 8 metals including the Group 8 noble metals (the platinum family of metals) including ruthenium, rhodium, palladium, osmium, iridium, and platinum. The rare earth metals are also useful in the process of this invention as adsorbents or promoters and are referred to as the lanthanides. Suitable rare earth metals include cerium, praseodymium, neodymium, samarium, europium, gadolinium, terbium, dysprosium, holmium, erbium, thulium, ytterbium, and lutetium.

The above-mentioned adsorbents are discussed in U.S. Pat. No. 4,692,318 which issued to Tolpin et al. on Sep. 8, 1987. This patent is hereby incorporated by reference herein.

Referring to FIG. 1, there is schematically shown one embodiment of the present invention. A gas-solid reaction system comprising reaction vessel 10 is shown having an entrance region 17 and an exit region 19. A protective layer 15 of inert ceramic and/or alumina pellets or spheres is shown placed in the area of the entrance region 17 of the gas-solid reaction system container 12. A second protective layer 15' is shown separating the first solid adsorbent bed 20 and the second solid adsorbent bed 22. A support zone 25 may also be disposed inside the container in the area of the exit region 19 resting on a support grid 26. The protective and support layers assist in maintaining the reaction system integrity, especially when the gas stream is in contact with the reaction system, but are not essential to the practice of this invention.

Figure 2:
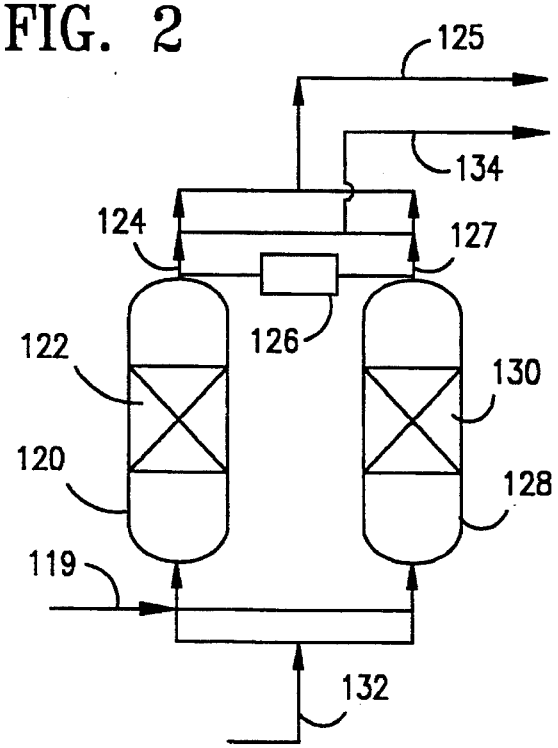
FIG. 2 is a schematic flow diagram of a fixed-bed system for regenerably recovering sulfur oxides from waste gas in accordance with the present invention.

Referring to FIG. 2, there is shown a system for connecting and operating two reactor systems similar to the one shown in FIG. 1 in parallel. In this embodiment of the present invention, a waste gas stream 119, containing, for example, sulfur oxides, is fed to a fixed-bed gas-solid reaction system 120 containing at least two solid adsorbent beds 122 having at least two different particle sizes with the larger particle size disposed inside said container in the area of the reaction vessel entrance. The solid adsorbent beds 122 adsorb substantially all of the sulfur oxide from the waste gas stream 119 and provide a treated gas stream through outlet conduit 124. The treated gas stream is fed through a valve system (not shown) to a line 125 leading to an incinerator or stack. While in an adsorbent mode, the reaction vessel 120 is operated at a temperature from about 400° F. to about 1,400° F. A temperature from about 900° F. to about 1,300° F. is preferred. The oxygen content of the waste gas stream 119 entering the solid adsorbent bed ranges from about 1 to about 5 vol %, with about 4 vol % preferred. Pressure within the reactor 120 should be maintained at a pressure of about 0.1 to about 10 atmospheres, preferably about 1 to about 2 atmospheres. The gas hourly space velocity (GHSV) should be about 500 to about 50,000 $hr^{-1}$, preferably, about 1,000 to about 20,000 $hr^{-1}$, more preferably, about 3,000 to about 5,000 $hr^{-1}$.

The outlet conduit 124 is monitored by a sensor 126 until sulfur dioxide break-through occurs. A suitable sensor is a Siemens Ultramat 22P infrared analyzer. Of course, other comparable analyzing equipment can be used. Sulfur dioxide break-through occurs when a substantial increase in the concentration of sulfur dioxide occurs in the conduit 124. This increase will be on the order of from about 3 ppm to about 250 ppm in less than 2 minutes. When sulfur dioxide break-through is detected, the waste gas stream 119 is directed through a suitable valve system (not shown) into a second fixed-bed reaction vessel 128 having at least two solid adsorbent beds 130 therein. The solid adsorbent beds 130 adsorb substantially all of the sulfur oxide from the waste gas stream 119 and provide a treated gas stream through outlet conduit 127. The treated gas stream is fed through a valve system (not shown) to a line 125 leading to an incinerator or stack. Concurrently, the valve system directs a reducing gas stream 132 to the first reactor 120 for regenerating the first two adsorbent beds 122. The reducing gas stream may contain hydrogen, hydrogen sulfide, carbon monoxide, or hydrocarbons, separately, in mixtures, or in combination with other gases such as nitrogen and water vapor.

During regeneration of the first two adsorbent beds 122 the temperature is maintained between about 400° F. and about 1,400° F., preferably between about 900° F. and about 1,300° F. The pressure in the reactor 120 is maintained at about 0.1 to about 10 atmospheres, preferably about 1 to about 2 atmospheres. The reducing gas stream 132 is fed into reactor 120 at a gas hourly space velocity (GHSV) of about 10 to about 1,000 $hr^{-1}$, preferably 100 to about 150 $hr^{-1}$.

Regeneration of the two beds 122 provides a hydrogen sulfide and/or sulfur dioxide bearing offgas stream through the outlet conduit 124, the valve system (not shown), and via line 134 to the sulfur plant for recovery of sulfur. The hydrogen sulfide and/or sulfur dioxide offgas stream may also contain water, elemental sulfur and unconverted reducing gas.

The waste gas stream 119 and the reducing gas stream are alternately fed to each one of the reaction systems 128, whereby each set of two solid adsorbent beds 122, 130 is first spent by sulfur oxides extracted from the waste gas stream 119, and then is regenerated by the reducing gas stream 132.

While a two reactor-vessel system is shown in FIG. 2, a three reactor-vessel system is preferred.

EXAMPLE 1

Experiments were conducted to determine the performance of adsorbents having different particle sizes in $SO_x$ removal from a gas stream. In order to determine the performance of various sized adsorbents, $SO_x$ uptake studies were performed using a bench-scale fixed bed system using various sizes of a commercially available magnesium aluminate spinel comprising cerium and vanadium. The adsorption of $SO_x$ was done at 1,200° F. using 6 grams of an extrudate which was prepared from the commercially available spinel, which was then crushed to various sizes, in a 11 mm diameter reactor. The adsorption was done using a gas stream containing 1% $SO_2$, 4% $O_2$ with the balance nitrogen and about 15% water vapor. Results of this testing are given in Table 1, below, where the final two columns show the $SO_x$ uptake capability of the adsorbent at a specified $SO_x$ breakthrough level into the product gas stream. The $SO_x$ uptake at a 20 ppm $SO_x$ breakthrough level was estimated. The larger particles were slower to take up $SO_x$. Without intending to be bound thereby, the inventors believe that this effect may be attributed to intra-particle mass transfer rate limitations due to the larger particle size.

TABLE 1

| Adsorbent Mesh | Size Dia, mm | Flow Rate cc/min | Wt. % $SO_x$ Uptake @ 20 ppm $SO_x$, est. | $SO_x$ Breakthrough 300 ppm $SO_x$ |
|---|---|---|---|---|
| 40/100 | 0.25 | 500 | 53 | 54 |
| 14/40 | 0.7 | 360 | 54 | 58 |
| 14/40 | 0.7 | 500 | 51 | 53 |
| 8/14 | 1.7 | 360 | 41 | 48 |
| 8/14 | 1.7 | 500 | 26 | 34 |

EXAMPLES 2 AND 3

A computer simulation of the adsorption fronts moving through the packed beds for conditions similar to ones encountered in a typical sulfur oxide adsorption process was written to explore the advantages of using the graded bed system of this invention as opposed to a bed packed with particles of a single size. Simulation of the adsorption of nitrogen oxide in packed beds would lead to similar results. The overall bed utilization in the case of the graded bed was compared with that of a bed with a single particle size. For the purpose of simplicity, it was assumed that the graded bed was packed with particles of two distinct sizes in two separate sections. A similar result would be obtained in the case of a bed composed of two sections, each containing a range of particle sizes, where the section at the inlet would contain the larger particle sizes and the trailing portion would contain a range of particle sizes which would be smaller than those in the first section.

The computer simulation was run for a packed bed in sulfur oxide removal service for two different packing strategies. In the first case, the bed was assumed to be packed with particles having a nominal diameter of 1/15 inch. The progress of the reaction wave-front for reaction of $SO_x$ with the sorbent in the bed was compared with that for a bed consisting of two sections containing 1/10 inch and 1/20 inch particles. Each of these comparisons was made for two different flow rates and at the same gas compositions.

EXAMPLE 2

In example 2, a gas flow velocity of 88.2 cm/s was assumed for the gas flowing into the sulfur oxide reduction process. Application of the Ergun equation:

$$\frac{\Delta P}{\Delta L} \left( \beta + \alpha \frac{(1-\epsilon)}{Re} \right) \left( \frac{G^2}{\rho g_c d_p} \frac{(1-\epsilon)}{\epsilon^3} \right)$$

where
$\Delta P$—pressure drop
$\Delta L$—bed depth
$\rho$—density
$d_p$—effective particle diameter (6 $V_p/A_p$)
$\epsilon$—void fraction
Re—particle Reynolds number
G—mass flow velocity
$\alpha, \beta$—constants
$g_c$—gravitational constant results in a value of 1.8 psi for the calculated pressure drop across a bed 115 cm deep, containing 1/15 inch particles. The same pressure drop can be taken across a graded bed containing 79.4 cm of 1/10 inch particles and 35.6 cm of 1/20 inch particles. The Ergun equation with the desired pressure drop and desired total bed length is used to determine the required dimensions for the beds containing the 1/10 inch and the 1/20 inch particles. The overall bed length and pressure drop are thus the same for the two cases. A computer simulation for the reaction of a mixture of 2% $SO_x$, 4% $O_2$ and 94% $N_2$ with the reactive particles in the beds produced the results shown in Table 2 below.

TABLE 2

| | Particle size, inches | |
|---|---|---|
| | Single Bed 1/15 | Graded Bed 1/10 & 1/20 |
| SOx breakthrough limit of 1 ppm | | |
| Breakthrough time, min. | 1,107 | 1,256 |
| Wt. % $SO_x$ adsorbed | 33.5 | 38.1 |
| Sorbent utilization, % | 72.3 | 82.0 |
| SOx breakthrough limit of 20 ppm | | |
| Breakthrough time, min. | 1,221 | 1,351 |
| Wt. % $SO_x$ adsorbed | 37.0 | 40.9 |
| Sorbent utilization, % | 79.7 | 88.2 |
| SOx breakthrough limit of 300 ppm | | |
| Breakthrough time, min. | 1,344 | 1,438 |
| Wt. % $SO_x$ adsorbed | 40.7 | 43.6 |
| Sorbent utilization, % | 87.8 | 93.9 |

Comparison of the results for the single bed and for the graded bed indicates that the overall bed utilization increases with the use of the graded bed, and that this increase is most pronounced at low breakthrough limits for $SO_x$ at the reactor outlet. Assuming a breakthrough limit of 1 ppm $SO_x$ at the reactor outlet, the graded bed can be continued in service for a longer time, which results in a sorbent utilization of 82% compared to 72.3% for a bed with a single particle size.

EXAMPLE 3

A comparison similar to that of Example 2 was done at a higher gas velocity, 105 cm/s, while maintaining all the other parameters the same. Applying the Ergun equation at this flow rate resulted in a calculated pressure drop of 2.258 psi. The graded bed was now assumed to contain 79.12 cm of 1/10 inch particles and 35.88 cm of 1/20 inch particles (with the total bed length remaining at the 115 cm of the bed with a single 1/15 inch particle size). Again, the Ergun equation with the desired pressure drop and desired total bed length is used to determine the required dimensions for the beds containing the 1/10 inch and the 1/20 inch particles. A computer simulation for the reaction of a mixture of 2% $SO_x$, 4% $O_2$, and 94% $N_2$ with the reactive particles in the beds produced the results shown in Table 3 below.

TABLE 3

| | Particle size, inches | |
|---|---|---|
| | Single Bed 1/15 | Graded Bed 1/10 & 1/20 |
| SOx breakthrough limit of 1 ppm | | |
| Breakthrough time, min. | 859 | 979 |
| Wt. % SO$_x$ adsorbed | 30.9 | 35.2 |
| Sorbent utilization, % | 66.6 | 76.0 |
| SOx breakthrough limit of 20 ppm | | |
| Breakthrough time, min. | 974 | 1,084 |
| Wt. % SO$_x$ adsorbed | 35.1 | 39.0 |
| Sorbent utilization, % | 75.6 | 84.1 |
| SOx breakthrough limit of 300 ppm | | |
| Breakthrough time, min. | 1,091 | 1,178 |
| Wt. % SO$_x$ adsorbed | 39.3 | 42.4 |
| Sorbent utilization, % | 84.6 | 91.4 |

Comparison of the results for the single bed and the graded bed again indicates that an improvement in overall bed utilization is experienced with the graded bed. In this example at a higher feed gas velocity, the incremental improvement due to the graded bed is greater than that at a lower feed gas velocity.

EXAMPLE 4

Figure 3:
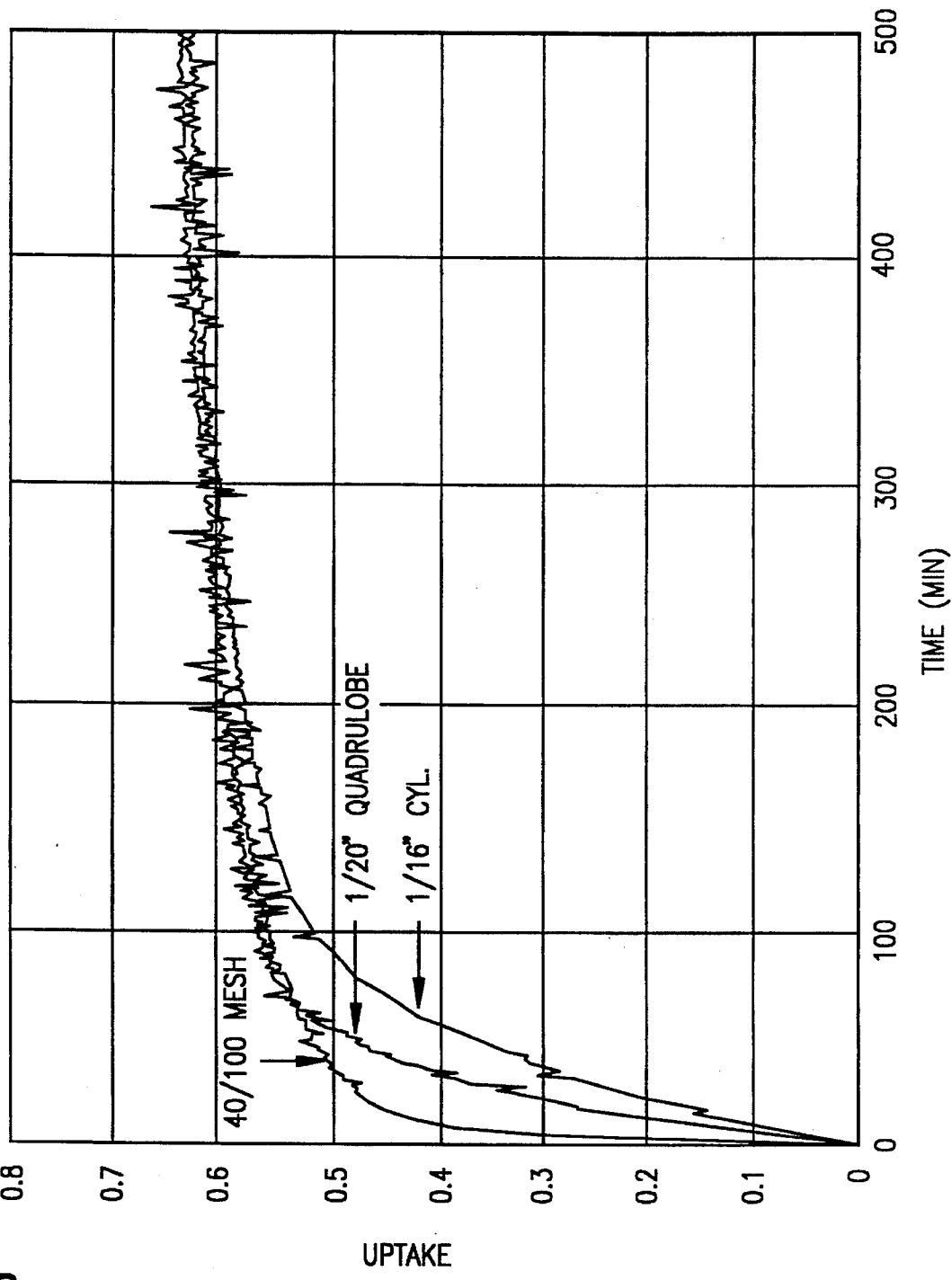
FIG. 3 is a graph showing the weight change of different particle sizes of solid adsorbents versus time for adsorption of sulfur oxides.

In a manner similar to that of Example 1 above, three different samples that were prepared from a commercially available magnesium aluminate spinel further comprising cerium and vanadium, a 40/100 mesh spray dried material, a 1/20 inch quadralobe extrudate and a 1/16 inch cylindrical extrudate were contacted with a 1% SO$_2$, 4% O$_2$, 95% nitrogen gas stream at 1,200° F. in a microbalance reactor. FIG. 3, reflecting the weight change per unit weight of adsorbent versus contacting time, shows the results of this example. Again here as in Example 1, the larger particles were slower to take up SO$_x$. This effect may be attributable to intraparticle mass transfer rate limitations due to the larger particle size.

Obviously, many other variations and modifications of this invention as previously set forth may be made without departing from the spirit and scope of this invention as those skilled in the art readily understand. Such variations and modifications are considered part of this invention and within the purview and scope of the appended claims.

What we claim is:

1. A process for adsorption of sulfur oxides from a waste gas which is substantially free of entrained particulate matter, said process comprising the steps of
   (a) contacting a waste gas which is substantially free of entrained particulate matter, which waste gas contains sulfur oxides with a solid adsorbent under conditions effective to promote capture of sulfur oxides from the waste gas onto the solid adsorbent to thereby produce a treated waste gas and a solid adsorbent having sulfur compounds thereon, the solid adsorbent having more than two particle sizes ranging from larger particles to smaller particles, the waste gas contacting the larger particles before contacting the smaller particles;
   (b) directing the treated waste gas from the solid adsorbent;
   (c) terminating contact between the waste gas and the solid adsorbent after the solid adsorbents have become substantially loaded with sulfur oxides as evidenced by breakthrough of increased amounts of sulfur oxides into the treated waste gas;
   (d) regenerating the solid adsorbent by contacting it with a reducing gas, under conditions effective to desorb at least a portion of the sulfur compounds thereon, thereby producing an offgas stream and a desulfated solid adsorbent;
   (e) directing the offgas stream from the solid adsorbent to a downstream sulfur recovery process; and
   (f) returning the desulfated solid adsorbent into contact with the waste gas.

2. The process according to claim 1 wherein a waste gas comprising sulfur oxides and particulates is directed through a suitable filter or guard bed to produce the substantially particulate-free waste gas which comprises sulfur oxides.

3. The process according to claim 1 wherein the contacting conditions of step (a) comprise a temperature of about 400° F. to about 1,400° F., a pressure of about 1 to about 2 atmospheres, and a gas hourly space velocity (GHSV) of about 1,000 to about 20,000 hr$^{-1}$.

4. The process according to claim 1 wherein the contacting conditions of step (a) comprise a pressure drop of less than about 5 psi across the solid adsorbent.

5. The process according to claim 1 wherein the breakthrough concentration of sulfur oxides into the treated waste gas of step (c) is less than about 20 ppm.

6. The process according to claim 5 wherein the solid adsorbent of step (c) is loaded to a level of greater than or equal to about 39 wt % SO$_x$ adsorbed.

7. The process according to claim 1 wherein the concentration of sulfur oxides in the waste gas which contacts the solid adsorbent in step (a) is less than about 2%.

8. The process according to claim 3 wherein a waste gas comprising sulfur oxides and particulates is directed through a suitable filter or guard bed prior to contacting the solid adsorbent in step (a), the concentration of sulfur oxides in the waste gas being less than about 2%, the contacting conditions of step (a) further comprising a pressure drop of less than 5 psi across the solid adsorbent, and the breakthrough concentration of sulfur oxides into the treated waste gas of step (c) less being than 20 ppm.

9. A process for adsorption of sulfur oxides from a substantially particulate-free waste gas, said process comprising the steps of
   (a) contacting a substantially particulate-free waste gas comprising sulfur oxides with a solid adsorbent under conditions effective to promote adsorption of sulfur oxides from the waste gas onto the solid adsorbent to thereby produce a treated waste gas and a solid adsorbent having sulfur compounds thereon, the solid adsorbent having a first average particle size and a second average particle size, the first particle size being larger than the second particle size, the waste gas contacting the larger particles before contacting the smaller particles;
   (b) directing the treated waste gas from the solid adsorbent;
   (c) terminating contact between the waste gas and the solid adsorbent after the solid adsorbents have become substantially loaded with sulfur oxides as evidenced by breakthrough of increased amounts of sulfur oxides into the treated waste gas;
   (d) regenerating the solid adsorbent by contacting it with a reducing gas, under conditions effective to desorb at least a portion of the sulfur compounds thereon, thereby producing an offgas stream and a desulfated solid adsorbent;

(e) directing the offgas stream from the solid adsorbent to a downstream sulfur recovery process; and (f) returning the desulfated solid adsorbent into contact with the waste gas.

10. The process according to claim 9 wherein a waste gas comprising sulfur oxides and particulates is directed through a suitable filter or guard bed to produce the substantially particulate-free waste gas which comprises sulfur oxides.

11. The process according to claim 9 wherein the contacting conditions of step (a) comprise a temperature of about 400° F. to about 1,400° F., a pressure of about 1 to about 2 atmospheres, and a gas hourly space velocity (GHSV) of about 1,000 to about 20,000 $hr^{-1}$.

12. The process according to claim 9 wherein the contacting conditions of step (a) comprise a pressure drop of less than about 5 psi across the solid adsorbent.

13. The process according to claim 9 wherein the breakthrough concentration of sulfur oxides into the treated waste gas of step (c) is less than about 20 ppm.

14. The process according to claim 13 wherein the solid adsorbent of step (c) is loaded to a level of greater than or equal to about 39 wt % $SO_x$ adsorbed.

15. The process according to claim 9 wherein the concentration of sulfur oxides in the waste gas which contacts the solid adsorbent in step (a) is less than about 2%.

16. The process according to claim 9 wherein a waste gas comprising sulfur oxides and particulates is directed through a suitable filter or guard bed prior to contacting the solid adsorbent in step (a), the concentration of sulfur oxides in the waste gas being less than about 2%, the contacting conditions of step (a) further comprising a pressure drop of less than 5 psi across the solid adsorbent, and the breakthrough concentration of sulfur oxides into the treated waste gas of step (c) less being than 20 ppm.

17. A process for adsorption of sulfur oxides from a substantially particulate-free waste gas, said process comprising:

(a) providing a reaction vessel comprising a container having an entrance region and an exit region, a first solid adsorbent disposed in a first bed inside said container in the area of said entrance, a second solid adsorbent having a particle size smaller than that of said first solid adsorbent, said second solid adsorbent disposed in a second bed inside said container;

(b) passing a substantially particulate-free waste gas stream comprising sulfur oxides into said reaction vessel through said entrance region;

(c) successively contacting said waste gas stream with said first and second solid adsorbents at a pressure and temperature sufficient to promote adsorption of sulfur oxides onto said solid adsorbents and to thereby produce a treated waste gas;

(d) passing said treated waste gas stream from said reaction vessel through said exit region;

(e) ceasing adsorption of sulfur oxides on said first and second solid adsorbents after said solid adsorbents have become substantially loaded with sulfur oxides as evidenced by breakthrough of increased amounts of sulfur oxides into the treated waste gas stream;

(f) regenerating the first and second solid adsorbents by contacting them with a reducing gas, at a pressure and temperature wherein said sulfur oxides are desorbed from said solid adsorbents into an offgas stream; and (g) passing said offgas stream from said reaction vessel through said exit region into a downstream sulfur recovery process.

18. The process according to claim 17, wherein said gas-solid reaction system comprises at least two reaction vessels each including two solid adsorbent beds, wherein said waste gas stream is fed to a first one of said reaction vessels through its entrance region until the solid adsorbent beds therein are spent with adsorbed sulfur oxides; thereafter said waste gas stream is fed to a second one of said reactors; and said reducing gas stream is fed to said first one of said reactors to desorb said sulfur oxides.

19. The process according to claim 18, wherein said waste gas stream and said reducing gas stream are alternately fed to each one of said reaction vessels through its entrance region, wherein the solid adsorbent beds therein are first spent with adsorbed sulfur oxides and the solid adsorbent beds therein are then regenerated by said reducing gas stream.

20. The process according to claim 17, wherein said first and said second solid adsorbents comprise magnesium aluminate spinels further comprising cerium and vanadium.

21. The process according to claim 17 wherein a waste gas comprising sulfur oxides and particulates is directed through a suitable filter or guard bed to produce the substantially particulate-free waste gas which comprises sulfur oxides.

* * * * *